Oct. 27, 1964 P. ROBINSON 3,154,439

METHOD FOR FORMING A PROTECTIVE SKIN FOR TRANSISTOR

Filed April 9, 1959

INVENTOR
Preston Robinson
BY Connolly and Hutz
ATTORNEYS 3,154,439

METHOD FOR FORMING A PROTECTIVE SKIN FOR TRANSISTOR

Preston Robinson, Williamstown, Mass., assignor to Sprague Electric Company, North Adams, Mass., a corporation of Massachusetts Filed Apr. 9, 1959, Ser. No. 805,264
1 Claim. (Cl. 148—1.5)

This invention relates to the surface of semiconductor devices and, more particularly, to the protection of the surface of a semiconductor device containing a pn junction.

Semiconductor devices containing materials of opposite conductivity type derive effectiveness from the concentration of certain impurities within the body. Further, the performance of a semiconductive device is dependent upon the proper electrical conditions prevailing in connection with the device. For example, it is valuable to provide a semiconductive device with means which avoid the formation of a spurious electrical path at the pn rectifying junction. It will be readily appreciated that unwanted short-circuiting in connection with the electrode contacts of a semiconductive device will destroy its purpose. Semiconductive devices are small with close spacing of operating parts. Such conditions make the preservation of proper electrical conditions difficult.

It is an object of this invention to provide a semiconductive device having a body skin which guards against minimizing the electrical efficacy of the semiconductive device.

It is another object of this invention to provide a method of producing a protective surface skin on a semiconductive device.

Figure 1:
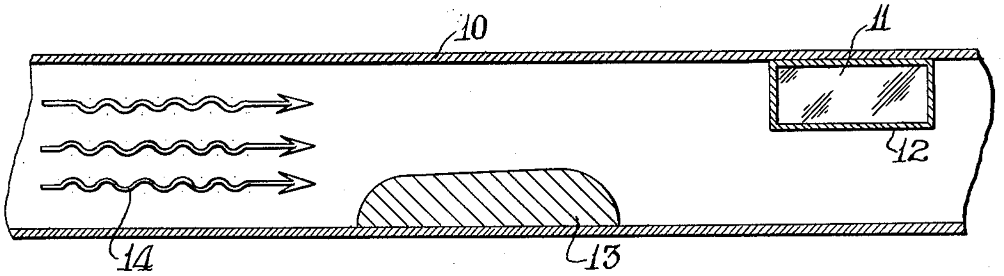
Figure 2:
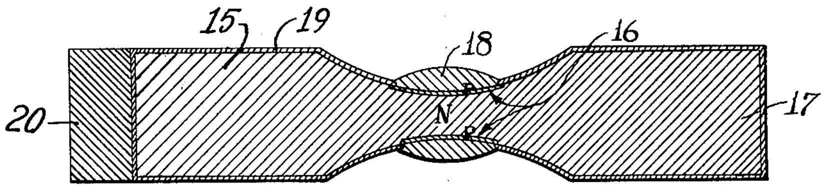

These and other objects of this invention will become more apparent upon consideration of the following description taken together with the accompanying drawings in which:

FIGURE 1 is a diagrammatic showing of apparatus for a method of producing a protective skin on a semiconductive body according to this invention; and FIGURE 2 is a vertical section of a transistor having a protective skin according to this invention.

In general, this invention provides a semiconductive device having a base which is covered with a protective skin of a compound which is resistant to electrical degradation and to the reception by diffusion of spurious impurities. The protective skin of this invention is developed by the substitution in the oxide coating on the outer layer of the semiconductive body of a metal element which provides the skin with more resistant properties.

A semiconductive device such as a pnp transistor has a body of semiconductive material with a pn rectifying junction within its surfaces. At the completion of the fabrication of such a device, the outer surface of the body of semiconductive material is treated by a surface treatment to establish controlled and permanent surface layers. Such treatment includes the removal of any high-conductivity layer which would tend to shunt the junction, the minimization of contamination and the formation of an oxide layer of the semiconductive material of the body. For example, in a transistor having a germanium body a layer of germanium oxide is formed on the surface. This oxide coating serves to cover the body and the junction. However, this oxide coating has undesirable features. It is sensitive to humidity and to moisture which defeats its purpose as a protection.

According to this invention, a protective skin may be formed from this oxide surface layer. This formation is achieved by converting the layer to a protective skin in a process which removes the semiconductive material substance from the surface layer and places it to form a resistant oxide which becomes the protective skin. A gas is passed through a conduit at the proper temperature and contacting a mass of element such as aluminum forms a gaseous compound with the element. The gaseous compound being moved by the current contacts the transistor body and by double decomposition substitutes the element such as aluminum for the germanium or other metal of the surface layer. Thus, a protective skin is formed of the oxide of the picked-up metal and the germanium is removed in a compound as a gas.

The reacting gas is an element which, upon reacting with the element to be combined on the semiconductor device, will form a gas at the temperature of the treatment. In this way, the skin-forming element can be transposed from its source to the semiconductor device. An example of the original reacting substance is iodine. At temperatures in the range of 150° to 300° C., iodine is a gas. An example of the transposed element for combination into the protective skin, aluminum metal is particularly desirable. At temperatures in the range of 150° to 300° C., aluminum iodide is a gas. On coming in contact with a semiconductor body of germanium having a germanium oxide skin, the aluminum iodide reacts with the germanium oxide to result in the stable aluminum oxide and a gaseous by-product of germanium iodide which is removable from the area as an effluent.

Suitably prepared iodine gas free of contaminating reactants passed through a conduit at a temperature in the range of 150° to 300° C. and brought into contact with a source of aluminum metal in this temperature range will form gaseous aluminum iodide. The current of gas in the conduit then can carry the aluminum iodide to a germanium semiconductor body having a germanium oxide surface skin. A double decomposition reaction between the aluminum iodide and the aluminum oxide took place forming an aluminum oxide protective skin on the body and removing germanium iodide from the semiconductor body as a gaseous compound. The following equations represent the reactions which took place:

$$3I_2+2Al=2AlI_3$$
$$4AlI_3+3GeO_2\rightarrow 2Al_2O_3+3GeI_4$$

A germanium oxide surface skin on a germanium body may similarly be replaced by a permanent titanium oxide protective skin by means of a current of fluorine and a source of titanium metal. The fluorine gas passing along a conduit and coming into contact with the titanium metal formed titanium fluoride gas. Titanium fluoride gas moved to the semiconductor body with its germanium oxide skin reacted with the skin to form titanium oxide in situ and the effluent germanium fluoride vapor. The following equations represent the reactions:

$$2F_2+Ti=TiF_4$$
$$TiF_4+GeO_2\rightarrow TiO_2+GeF_4$$

The method of providing this substitution is diagrammatically illustrated in FIGURE 1 in which a conduit 10 is shown containing a semiconductor body 11 of germanium having a surface skin 12 of germanium oxide. A mass 13 of aluminum metal is positioned in the conduit 10 adjacent to the semiconductor body 11 but spaced away and to the left as seen in FIGURE 1. A current 14 containing iodine gas is shown passing through the duct 10 from left to right so that it first contacts the aluminum mass 13. At a temperature of operation in the range of from 150° C. to 300° C., the iodine gas of current 14 attacks the elemental aluminum and, dissolving it in the current 14, forms aluminum iodide gas. The aluminum iodide carried by the current 14 from the aluminum mass 13 to the semiconductor body 11 where it attacks the body 11 to substitute the germanium oxide of the surface skin 12 with a protective skin of aluminum oxide and to form a gaseous effluent of germanium iodide which is carried away from the body 11 by the current 14.

To exemplify this invention, a current was made up of suitably prepared iodine gas free of contaminating reactants. This iodine gas current at a temperature of 200° C. was passed through a conduit. A mass containing elemental aluminum was positioned in the conduit in the path of the current and was reacted with the gaseous iodine at the 200° C. temperature. The reaction formed aluminum iodide gas which was carried in the current along the conduit to a semiconductor body positioned in the conduit in the path of the current. The semiconductor body of germanium oxide had been prepared with a surface layer of germanium oxide. The gaseous current of aluminum iodide passing along the conduit and coming into contact with the germanium oxide surface layer reacted with the germanium oxide. An aluminum oxide surface skin was formed on the semiconductor body and the resultant by-product germanium iodide was removed from the semiconductor body and out of the conduit in the current.

In the above-described embodiment of this invention, the semiconductor body is described as a semiconductive material covered with an oxide of the semiconductive material, such as germanium with germanium oxide. This is one embodiment of this invention. A modification of this invention may apply the aluminum oxide protective skin to a body in an assembled transistor. In this modification, a transistor having aluminum electrodes may be subjected to a process according to this invention. In this modification, the formation of the protective skin may be carried out with the aluminum electrodes in place without damage or contamination of the electrodes. The method is substantially as described above in connection with the formation of the aluminum oxide protective skin on a semiconductor body as the current of aluminum iodide will not attack the aluminum electrodes, but will enter into a double decomposition reaction with a germanium oxide skin on the semiconductor body of the transistor. FIGURE 2 illustrates a transistor including a body 15 having a p-layer 16 and n-layers 17 to which are attached a pair of aluminum electrodes 18. The entire body 15 is covered with a thin skin of germanium oxide, shown greatly exaggerated in FIGURE 2 for purposes of illustration. The skin 19 may be formed of aluminum oxide from germanium oxide according to the process described above with the aluminum electrodes 18 in place. The aluminum iodide vapor, in not attacking the aluminum electrodes, permits the substituted aluminum oxide of the skin 19 to be brought into contact with the electrodes 18. A base electrode 20 is shown.

There is an advantage in applying a protective skin after the attachment of the electrodes. During the attachment of contacts to a transistor, the attachment techniques may damage the material adjacent the contacts by applying the protective skin as the last step in a transistor assembly. It is possible to remove the high conductivity shorts and to minimize the contamination as well as providing the protective skin in a permanent way and avoid the danger of destroying this clean-up and protective procedure.

Among the broader advantages of this invention is the provision of a simple method of producing a protective skin on a semiconductive body after its formation with a pn rectifying junction. The action in producing the protective skin occurs only at the surface skin on the semiconductive body and this does not alter the semiconductive properties of the semiconductive device, as already established during its production. For this reason, the protective skin formation may take place as a last step in semiconductive device production. Further advantages of this invention are found in the method of treating the semiconductor body by a moving current of gas which eliminates mechanically moving parts and allows the treatment of a large number of units at one time and in a continuous process. Further, the germanium removed may be salvaged from the germanium iodide gas.

Deferred embodiments of this invention have been set forth for the purpose of illustration only and it will be understood that the described embodiments may be modified by those skilled in the art without departure from the spirit of this invention, and it is intended that the invention be limited only by the scope of the claim.

What is claimed is:

A process for treating a semiconductive body containing germanium with aluminum electrodes integral therewith, said germanium body having a germanium oxide surface skin, which comprises passing a hot iodine gas through a conduit into contact with a body of aluminum metal therein, the temperature being adapted for forming hot gaseous aluminum iodide within said conduit, passing said hot gaseous aluminum iodide into contact with the aforesaid germanium body positioned in said conduit, to thereby form an aluminum oxide protective skin on said germanium body and germanium iodide, and removing the gas comprising germanium iodide.

References Cited in the file of this patent

UNITED STATES PATENTS

| | | |
|---|---|---|
| 2,692,839 | Christensen | Oct. 26, 1954 |
| 2,701,216 | Seiler | Feb. 1, 1955 |
| 2,753,281 | Scaff | July 3, 1956 |
| 2,754,456 | Madelung | July 10, 1956 |
| 2,804,405 | Derick | Aug. 27, 1957 |
| 2,835,615 | Leinfelder | May 20, 1958 |
| 2,854,364 | Lely | Sept. 30, 1958 |
| 3,001,896 | Marinace | Sept. 26, 1961 |

OTHER REFERENCES

Chemical Abstracts, vol. 51, No. 20, October 25, 1957 (page 15319 relied upon).

J. W. Mellor: Comprehensive Treatise on Inorganic & Theoretical Chemistry, vol. 6, 1925, page 961.